United States Patent

[11] 3,549,109

| | | |
|---|---|---|
| [72] | Inventor | James B. Gilstrap<br>8440 Thames St., Springfield, Va. 22151 |
| [21] | Appl. No. | 806,024 |
| [22] | Filed | Mar. 5, 1969 |
| [45] | Patented | Dec. 22, 1970<br>Continuation-in-part of Ser. No. 475,296,<br>July 27, 1965, abandoned. |

[54] OPTICAL FLIGHT CONTROL SYSTEM
5 Claims, 10 Drawing Figs.

[52] U.S. Cl.................................................. 244/77,
244/17.11, 356/254
[51] Int. Cl.........................................B64c 13/18,
B64c 27/68
[50] Field of Search........................................ 244/77,
77D, 17.13, (Inquired), 138, 17.11; 350/301, 302;
88/1.5; 356/250, 253, 254, 255, 172, (Inquired);
33/46.5, (Inquired); 74/534

[56] References Cited
UNITED STATES PATENTS
2,650,046  8/1953  Vanderlip.

| | | |
|---|---|---|
| 2,873,075 | 2/1959 | Mooers et al. |
| 2,966,063 | 12/1960 | Schaefer. |
| 2,998,210 | 8/1961 | Carter, Jr. |
| 3,127,133 | 3/1964 | Glatfelter et al. |
| 3,276,311 | 10/1966 | Buchmaster et al. |

*Primary Examiner*—Milton Buchler
*Assistant Examiner*—Jeffrey L. Forman
*Attorneys*—L. A. Miller, Q. E. Hodges and A. Sopp ABSTRACT: A hover coupler for a hoverable or rotary wing aircraft has two-axis optical sighting means located on the aircraft remote from the pilot's position and operated by another person who may acquire without being subject to vertigo a target over which hover is eventually desired. The optical sighting means are provided with controls for feeding pitch and roll signals to stabilization amplifier means already provided on the craft so that the target may be acquired and hovered over under control of said operator with or without the assistance of the pilot. Cable or other hoisting means are located on the aircraft in alignment with said optical sighting means for improved ease of rescue.

PATENTED DEC 22 1970

INVENTOR,
James B. Gilstrap

BY Frank A. Lukasik

ATTORNEYS

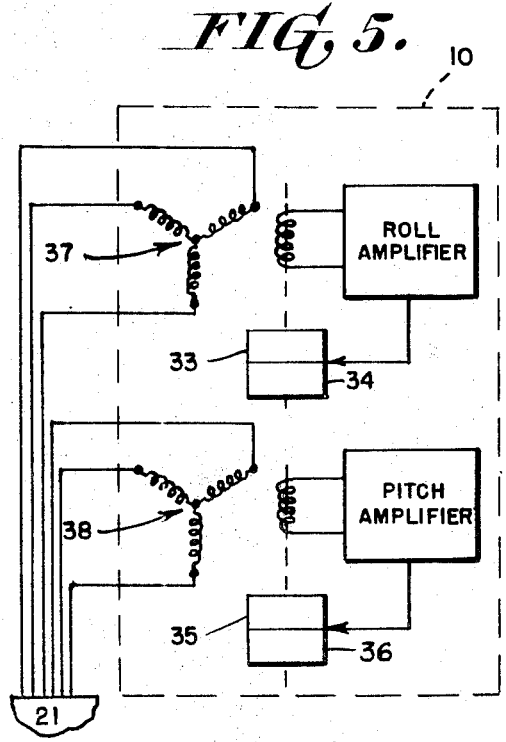
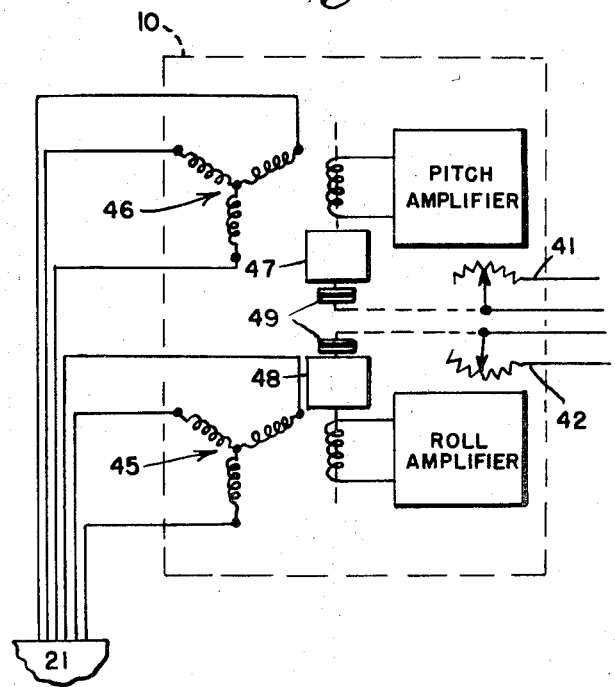
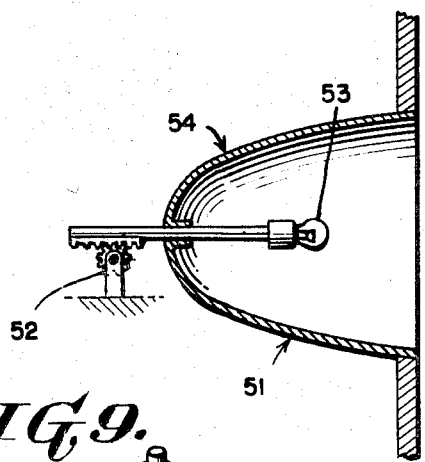
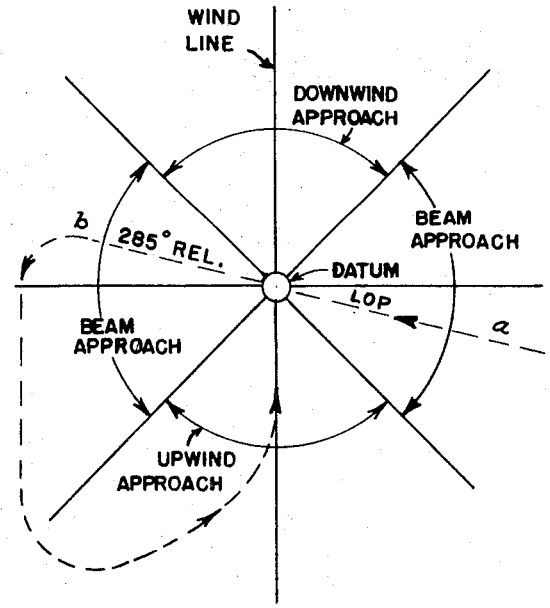
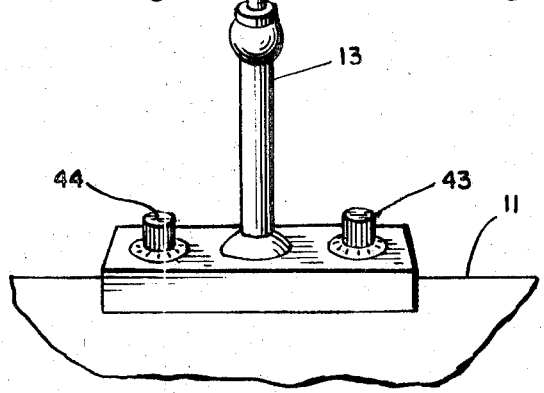

INVENTOR
James B. Gilstrap

BY Frank A. Lukasik

MB Childs

ATTORNEYS

3,549,109

OPTICAL FLIGHT CONTROL SYSTEM

This application is a continuation-in-part of application Serial No. 475,296 filed on Jul. 27, 1965, now abandoned.

The invention described herein may be manufactured and used by or for the Government of the United States of America for governmental purposes without the payment of any royalties thereon or therefor.

BACKGROUND AND SUMMARY OF THE INVENTION

The present invention relates to rotary wing aircraft and more particularly to a line of sight hover coupler for maintaining the aircraft along a certain course and then keeping the aircraft in a condition of hovering flight relative to a fixed spot on the earth's surface.

Hoverable aircraft such as rotary wing aircraft, because of their inherent instability, require constant attention of the pilot particularly in the control of hovering flight. Since hovering flight is generally done directly over a target at relatively low altitude, it is essential that accurate and fully stabilized operation be provided without requiring the pilot to lean out of the aircraft thus subjecting himself to vertigo. It is also desirable, in affecting a transition to a hover over a fixed geographic position, to initially view objects or targets at a distance from a moving rotary wing aircraft, as well as downwardly to the terrain directly beneath the aircraft.

Helicopters have a number of inherent disadvantages in maintaining a given flight line and controlling hovering. Recently helicopters have been equipped with a hover trim control to allow an observer to introduce signals of a very small magnitude into the control system to correct any slight drifting of the helicopter while hovering. This control, although effective in controlling hover position, is not capable of effecting a transition from flight at substantial ground speed to hovering flight, the most critical phase of a rescue operation.

A difficulty encountered under visual and instrument flight conditions is very often due to the strong tendency for changing attitudes under conditions of minimum visual reference to induce the phenomenon known as "vertigo" into the sensual faculties of the pilot(s). Vertigo can be briefly described as visual illusions which may occur as a result of attempting to fly by visual reference outside of the aircraft when conditions of flight demand reference to instruments. For example, a sloping cloud bank sometimes creates the sensation of flying in a banked attitude. The tendency to level the wings of the aircraft with the slope of the clouds is annoying, if not confusing, for the instruments contradict this impression of flight.

The general purpose of this invention is to provide an effective hovering helicopter control which includes all the advantages of present controls included in rotary wing aircraft and possesses none of the aforedescribed disadvantages. The present invention provides visually those inputs to a helicopter's automatic stabilization equipment which enable hover over a fixed or moving object or target such as a downed pilot. Signals are also transmitted to a hover indicator on the instrument panel when the manual mode of operation is selected. It is thus possible for the pilot to effect the transition and maintain the hover from the information available to him on the instrument panel, when the position of the sighting device is interpreted on the hover indicator.

OBJECTS OF THE INVENTION

It is therefore an object of the present invention to provide an improved hover control for rotary wing aircraft.

An additional object of the present invention is to provide an aircraft of the above type with an optical hover control including means for compensating for forward and lateral movements of the craft while hovering.

A still further object is to provide apparatus for controlling displacement of a rotary wing aircraft about its principal axes during hover and transition thereto over a fixed or moving object.

Another object of the invention is to provide an aerial viewing apparatus which is coupled into the automatic stabilization equipment to provide hover control of a rotary wing aircraft by a nonpilot observer located on the craft.

With these and other objects in view, as will hereinafter more fully appear, and which will be more particularly pointed out in the following detailed description, reference is now made to the following description taken in connection with the accompanying drawings in which:

BRIEF DESCRIPTION OF THE DRAWINGS

FIG. 5 is a schematic view of the servomechanism used with the optical system;

FIG. 6 is a schematic view of the servomechanism for controlling the vehicle in flight;

FIG. 7 shows, in section, a view of an adjustable focus searchlight for use with the optical system;

FIG. 8 is a view of typical approach pattern for a helicopter employing the present invention;

FIG. 9 is a view of the nonpilot observer's controls;

Referring now to the drawings, wherein like reference characters designate like or corresponding parts throughout the several views, there is shown:

DETAILED DESCRIPTION OF THE INVENTION

Figure 1:
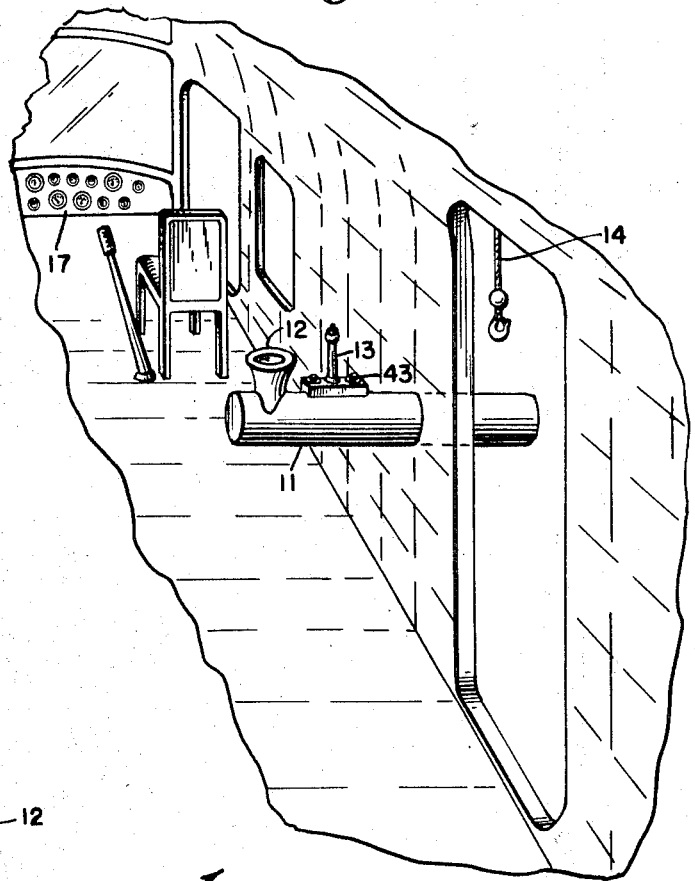
FIG. 1 shows a perspective view of a preferred embodiment of the invention.

The line of sight hover coupler shown in FIG. 1 comprises a periscope 11 mounted to protrude from the starboard side of the hoverable aircraft or helicopter and in alignment with the helicopter's hoist cable 14. By "hoverable" is meant a zero-ground speed capability of an aircraft when in flight. A rubber eyepiece 12 is attached to allow visual access to the optical system 15 (FIG. 3) enclosed in periscope 11. The optical system 15 (FIG. 2), with which periscope 11 is provided, can be positioned manually by a nonpilot observer to provide a line of sight to a point over which it is desired to hover. It is also adjusted by the vehicle's gyrostabilization system to compensate for errors introduced into the line of sight by roll and pitch of the aircraft.

In order to maintain the line of sight in azimuth in a true direction, azimuth corrections are measured in the plane of the horizon and applied to the periscope in the deck plane. To generate these corrections, the equipment existing in the craft includes a coordinate transforming means which translates the heading of the aircraft, measured in the deck plane, to the plane of the horizon where it is compared with a selected true direction in the vehicle's already existing automatic stabilization equipment 16 (i.e. autopilot) to indicate true heading deviations. A correction between selected true direction and indicated true direction of the periscope 11 is measured in the plane of the horizon. The resulting corrections are applied as an error signal to the optical elements 15 and to the automatic stabilization equipment 16, thereby providing inputs which are required to program the hover transition to a fixed or moving geographic position. The transition may also be carried out in conjunction with altitude inputs from the vehicle's radar altimeter.

Figure 2:
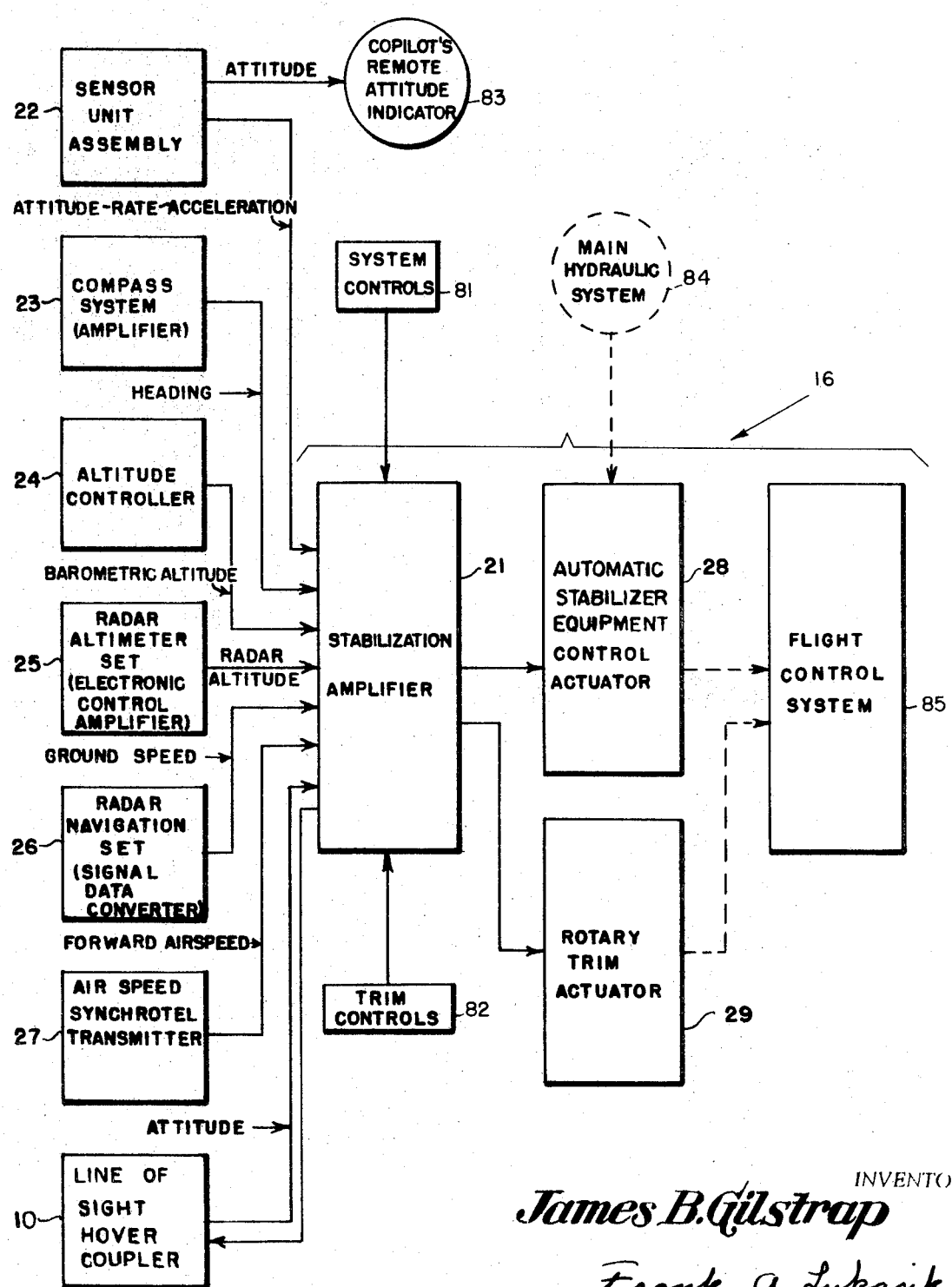
FIG. 2 is a block diagram of the automatic stabilization equipment ordinarily employed for navigation in hoverable aircraft such as helicopters.

A block diagram of the hover coupler as connected into the aircraft's automatic stabilization system is shown in FIG. 2. The stabilization amplifier 21 of the aircraft's automatic stabilization system 16 serves as the nerve center for the system. Signals from sensing instruments 22—27, pilot controls 81, 82 and the line of sight hover coupler 10 are fed into the stabilization amplifier 21. The stabilization amplifier 21 is an item of well known construction in the art and, thru well known amplification, switching, gain control and mixing arrangements provides outputs as indicated which (1) control the automatic stabilization equipment control actuator 28, which in turn hydraulically operate the flight controls 85, and (2) actuate the rotary control trim actuators 29 which modify the stick trim position. Helicopter attitude changes are sensed by gyroscopic instruments in the sensor unit assembly 22 and the compass system amplifier 23. Barometric altitude is sensed in the altitude controller 24. Altitude clearance above the terrain is sensed by the radar altimeter set 25. Lateral, longitudinal, and vertical velocity signals are provided by the radar navigation set 26. An indicated airspeed signal is furnished to the automatic stabilization equipment or autopilot 16 by the airspeed synchrotel transmitter 27.

The well-known autopilot system is used in conjunction with associated electronics and hydraulic systems to provide an essential part of the pilot's aids, required for antisubmarine warfare (ASW) and search and rescue (S/R). When the stabilization system is engaged, deviation from the established pitch, roll, heading or altitude reference is sensed by these well-known instruments, resulting in corrective control signals being applied by the amplifier 21 to the longitudinal, lateral, directional or collective control servos on the automatic stabilization equipment control actuator 28. Manual operation by the pilot causes the amplifier output to the rotary trim actuator 29 to maintain the pilot's controls in positions corresponding to the aircraft's flight condition so that there is no transient on disengagement of the automatic stabilization equipment 16. Pilot control of the aircraft through the stabilization system is obtained by normal operation of the pedals, cyclic stick and collective stick and the trim switches associated with the attitude controls. System controls 81 and trim controls 82 introduce stability corrections into the flight control system 85 through the stabilization amplifier 21 in such a manner that the pilot maintains complete control of the helicopter through normal use of flight controls. The copilot can monitor the attitude of the aircraft on the copilot's remote attitude indicator 83. Power to operate the flight control servo hydraulic system is provided by the main hydraulic system 84. The automatic stabilization equipment 16 is connected to the hydraulic boost of the flight control system 85 by servo valves.

The conventional stabilization system referred to above has several modes of operation, 5 of which are: (1) attitude and directional stabilization; (2) barometric altitude stabilization; (3) automatic cruise and hover-through signals received from the radar Doppler mode including the capability of setting ground speed, drift, and altitude below 1,000 feet actual; (4) automatic approach to a hover through signals received from the radar Doppler mode; (5) automatic hover through signals received from the cable angle and hydrostatic height indicator. According to the invention the line of sight hover coupler 10 is arranged to coact with the autopilot 16 to effectuate a hover transition to a fixed or moving geographic position in conjunction with the radar altimeter 25.

The line of sight hover coupler 10, when coupled to the stabilization system, enables comparison of the displacement of a sighting mechanism described below, in terms of electric potential or its equivalent, with the lateral and longitudinal cyclic stick displacement at two fixed references; that is, normal cruising speed, for longitudinal cyclic and at zero airspeed for both longitudinal and lateral cyclic. These references are fixed in accordance with standard center of gravity conditions. Thus, when the stick of controller 13 is engaged to the automatic stabilization equipment 16 while in the full forward position (e.g. against its physical stops) at normal cruising speed, the helicopter should experience no attitude change; but as the stick of controller 13 is moved aft, toward the position which represents a no-wind hover, there is a difference sensed between the position of the cyclic stick and that of the line of sight hover coupler controller 13, moving the cyclic control a proportionate distance aft. The change in the angle of the line of sight resulting from attitude changes during the deceleration must be anticipated by the operator or, in the alternative, by the automatic lens positioning system.

According to the invention an automatic lens positioning system includes synchro-transmitters and receives actuated from a gyroscopic frame located in the stabilization system which, through the stabilization amplifier and control servomotors, serves to drive the correcting optical elements of the sighting device to compensate for roll and pitch of the helicopter.

Figure 3:
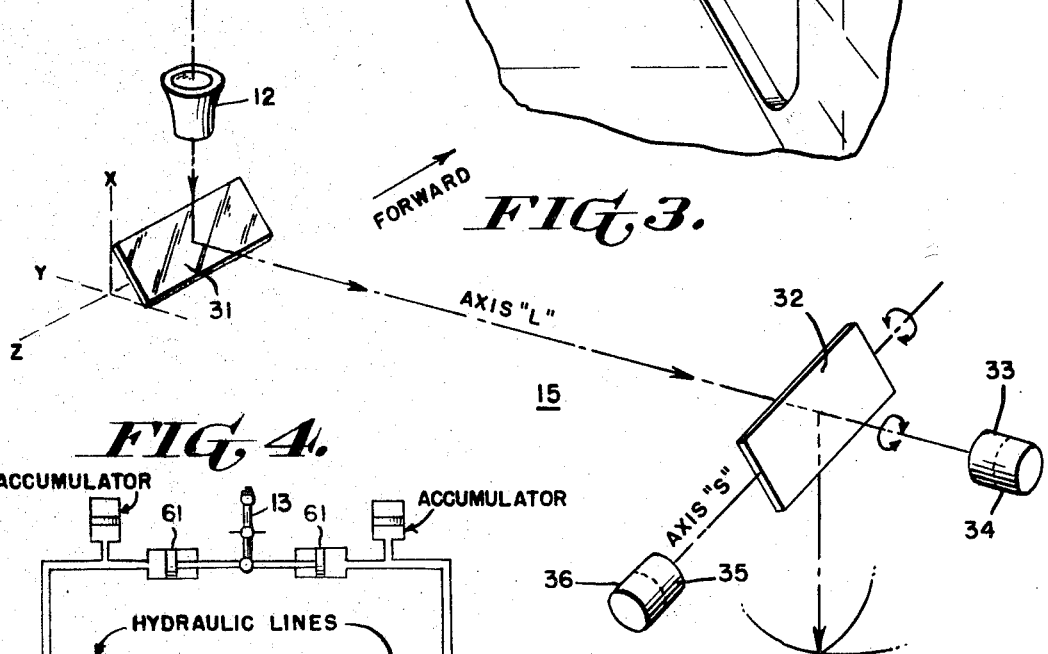
FIG. 3 is a schematic view of an optical sighting system according to the invention.

In particular, as shown in FIG. 3, the optical system 15 of the laterally disposed periscope 11, includes a fixed lens or mirror 31 and a rotatable lens or mirror 32 mounted to the airframe as to direct a line of sight from the eyepiece to the right, parallel to the helicopter's lateral axis. Lens or mirror 32 is capable of rotation about two axes, but in its neutral position, directs the line of sight from lens or mirror 31 to an area of view directly below an aircraft. Mirror 32 can be positioned by the operator about an axis which coincides with a line of sight to its center from mirror 31 (axis L) and about a bisecting axis in the plane of the mirror 32 which is parallel to the aircraft's longitudinal axis (axis S) If desired, a sighting reticle (not shown) may be fixed to the surface of mirror 32 to encompass a circle of about ten feet radius on the surface of the earth at a hovering altitude of 30 feet.

Figure 4:
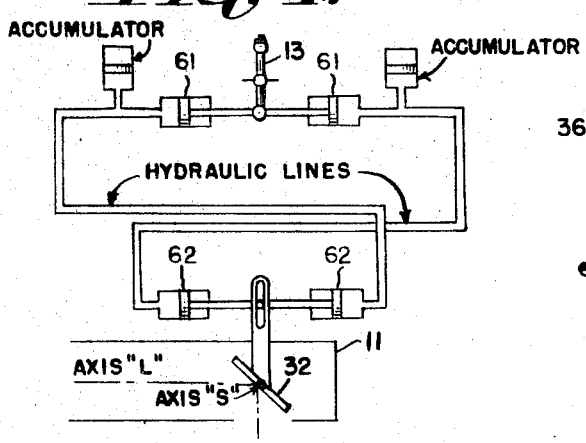
FIG. 4 is a schematic view of a hydraulic control used with the optical system.

The hydraulic controlled pistons 62 of the alternative embodiment shown in FIG. 4 perform a function similar to the synchro-transmitter-receiver system mentioned above in detecting and controlling movement of the mirror 32. In the alternative embodiment, the controller 13 can be linked directly to form completely independent, but identical hydraulic systems consisting of power pistons 61, 62 positioned by the controller 13.

A synchro-transmitter 33 and a roll-servomotor 34, shown in FIG. 5, are mounted to control via a roll amplifier movement of the optical sighting mirror 32 about the roll axis L. Also, a synchro-transmitter 35, and a pitch-servomotor 36 are mounted to control via a pitch amplifier movement of mirror 32 about the pitch axis L. Signals of roll and pitch which are obtained from the stabilized gyroscope system via the stabilization amplifier 21 are fed into the roll differential synchro 37 and the pitch differential synchro 38. The roll and pitch signals in windings 37 and 38 modify the positions of the coils of the synchros 33 and 35 to thereby compensate for roll and pitch the positions of the mirror in the optical sighting device.

In a matched pointer mode of operation, when it is desired to provide a line of sight with the present invention, the pilot directs the aircraft to cause the periscope 11 to be directed generally toward the object to be observed. The observer adjusts the optical sighting device along a line of sight. A simple synchro/servo may be provided to feed the optical line of sight directly to a matched pointer at the pilot's station, and the pilot may turn the aircraft until the aircraft is on a true heading which is the same as the heading to which the line of sight has been directed. The pilot, by following the pitch and roll commands from the observer's station, may then bring the craft to hover in accordance with the optical sighting.

Figure 10:
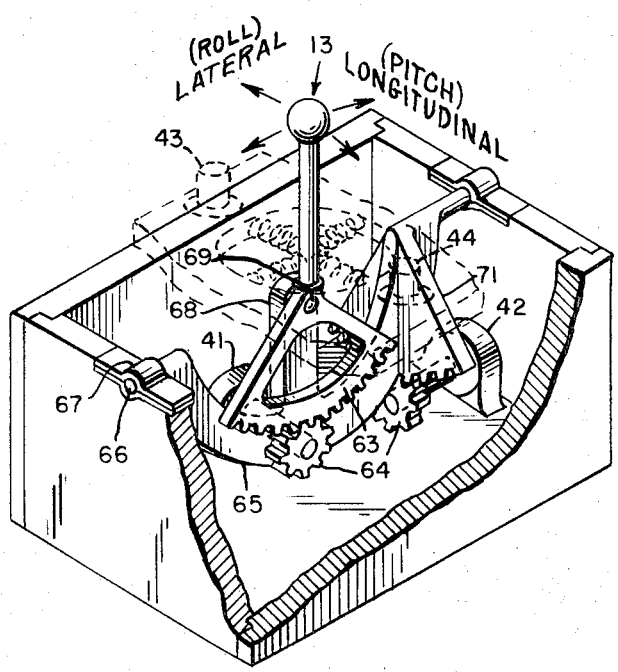
FIG. 10 is a view in perspective of the details of the nonpilot observer's controls.

The controller 13 (FIG. 9) is shown in the form of a spring centered control stick with a full scale, but rate dampened, authority of approximately 60—100 knots and fine pitch trim 43 and fine roll trim 44 control knobs. The stick of controller 13 is mechanically linked at its base to two potentiometers 41 and 42 (FIG. 10). Lateral movements of the stick of controller 13 provide the roll signals and fore-and-aft movement of the stick of controller 13 provides pitch signals. A pitch trim 43 and a roll trim 44 control knobs enable fine trimming roll and pitch signals enabling very accurate hover when the control stick is centered.

Referring to FIG. 10, details of the mechanical linkage of controller 13 are shown. Roll control potentiometer 42 is mounted on a partition in periscope 11. A gear segment 72 meshes with pinion 64 and forms a part of a generally semicircular member 65 which is terminated with diametrically opposed shafted portions 66 which are journaled in bearings 67.

Pitch control potentiometer 41 is carried by member 65. The shaft of pitch control potentiometer 41 is free to rotate with respect to member 65. Member 65 has a radially disposed arm 68 upon which is journaled a shaft 69 which in turn carries a gear segment 63. Gear segment 63 meshes with the pinion 64 on the pitch control potentiometer 41 and has secured thereto an extended arm, controller 13.

When the stick of controller 13 is tilted fore and aft, gear segment 63 is pivoted about the axis of shaft 69 and the pinion meshed therewith is rotated to adjust the wiper of potentiometer 41 to a position providing the required control signal. Hydraulic control piston 61 may be substituted for pitch control potentiometer 41 in the embodiment of FIG. 4.

When the stick of controller 13 is tilted left or right, gear segment 71 is thus caused to pivot about the axis of shaft portions 66 whereupon gear segment 71 causes rotation of associated pinion 64 and adjustment of the wiper of the associated potentiometer roll control potentiometer 42 to a position providing the required control signal. Hydraulic control 61 may be substituted for roll control potentiometer 42 in the embodiment shown in FIG. 4.

Movement of mirror 32 and control of the helicopters are synchronized in the stabilization amplifier which in turn feeds signals to an indicator 83 to indicate to the pilot exactly what he must do to maintain the helicopter on the programmed course and speed. As discussed in connection with FIG. 5, the output signals of the stabilization amplifier are converted into mechanical motion via servos 34, 36 to maintain a line of sight. However, it is not critical to the working of the present invention that the optical system be compensated thusly for roll and pitch because, as indicated in FIG. 2, the output of the hover coupler optics is fed to the stabilization amplifier 21, thus providing a stabilized signal enabling the pilot, by means of any suitable indicator 83 therefor, to maintain appropriate attitude (e.g. heading, pitch, roll, and therefore speed) to hold the reticle on the target.

Instead of providing a suitable indication to the pilot of the direction to a target based on the orientation of the optical sighting means in hover coupler 10, a further mode according to the invention provides cyclic stick control of the craft directly by the nonpilot observer. In essence, this arrangement of the invention provides at the nonpilot observer station a duplicate of the pilot's cyclic stick control, preferably rate damped in any suitable conventional manner, so that the nonpilot observer may control prehover, hover and post hover action of the craft. Essentially, as the craft nears a position near or over a target over which hover is intended, the nonpilot observer by movement of cyclic control stick of controller 13 feeds input signals to the stabilization amplifier 21 in the same manner as the pilot. Simultaneously, movement of the stick of controller 13 also provides via transmitters 33, 35, movement of the optical sighting means so that the craft is automatically continuously maintained in a correct attitude (pitch and roll orientation) by the very movement of the stick of controller 13 that enables retention of the target or object in the reticle or center position of the optical sighting means, say, directly beneath the craft.

Although any suitable well known means may be employed to effectuate the novel dual control hovering function from the nonpilot observer's station, the control arrangement shown in FIG. 6 is shown as an example thereof.

Initially the hover coupler unit 10 is calibrated so that when stick of controller 13 is exactly centered, the mirror 32 is oriented in pitch and roll to reflect a target directly therebelow on a plumb line. Such position of stick of controller 13 imparts no signal to synchros 33, 35 to cause movement of the mirror 32, and no signal in roll and pitch (cyclic control) to amplifier 21 to effectuate attitude of the craft, when the stick of controller 13 is moved, say in pitch, to a forward position, mirror 32 is also moved to reflect a target therebelow ahead of the craft. In that case a pitch signal is fed via potentiometer 41 to amplifier 21 producing a stabilized pitch signal to the flight control system 85. Assuming for a moment that the target is stationary, the craft therefore approaches the target and the observer draws back on stick of controller 13 in order to keep the target in the mirror, thereby automatically reducing pitch control signals until, ideally, zero speed hover is obtained with the mirror and cyclic pitch controls being in zero calibrated position.

Of course, under ordinary conditions, either the target is moving or there is wind, or both. In this case, the fine control knobs 43 and 44 are employed so that even with stick of controller 13 exactly centered, cyclic pitch controls are impressed, in the case of a helicopter, on the rotary blades. For example, for wind or target speed of 10 knots over the ground, the resultant of the pitch and roll trims 43, 44 is set at 10 knots. The trim controls 43, 44 are arranged to override potentiometers 41, 42 thereby providing a variable neutral position therefor different from their idealized calibrated neutral position, but without corresponding movement of the mirror 32. Therefore, at a craft speed of 10 knots for hover, a signal is continuously sent via amplifier 21 to either or both of synchro windings 45, 46. Because the speed of the target may vary from its assumed 10 knots, say to 9 knots, movement of the trim controls accordingly will alter the signal on windings 45, 46, thereby causing thru neutral coupling movement of the servo windings 47 and 48. Servos 47, 48 are coupled via engaged clutches 49 to the potentiometer arms of devices 41, 42, thereby establishing a new neutral point corresponding to 9 knots rather than 10 knots for said potentiometers.

Consequently, it is seen in relation to the device shown in FIG. 10 that the clutches 49 serve the important function of mechanically coupling the potentiometers to the controls 43, 44, enabling variation of the neutral points of potentiometers 41, 42. When the trim controls 43, 44, are not used, the clutches 49 may be disengaged, and the stick of controller 13 alone used to vary the setting on the potentiometers 41, 42. Of course, with the trim controls 43, 44, activated, there is enabled within a small range of variation control of craft attitude by virtue of stick of controller 13 at hovering speeds greater than zero either in wind or moving target conditions or both. Obviously, with conditions of wind and a stationary target, the controls 43, 44 should be used because wind is equivalent to a moving target in zero wind conditions.

It is understood, therefore, that with controls 43, 44 in use, the stick of controller 13 alone causes movement of the mirror and also causes movement of the arms of devices 41, 42 in either direction beyond their neutral positions as defined by the settings of controls 43, 44. The question of whether or not controls 43, 44 should be employed in a given situation is governed by the component vector summation of wind and target speed, the resultant vector being the trim control setting, e.g. target moving at 10 knots against a 20 knot wind implies a 30 knot setting on at least one trim control. A target moving at 10 knots with a wind of 10 knots implies a setting of zero. A target running before a wind of greater velocity than that of target implies a negative trim control setting for a rotary wing aircraft, or the equivalent positive setting on a craft heading of 180° to target, etc.

FIG. 7 illustrates a radiator such as a searchlight 51 which may be coupled to the line of sight hover coupler 10 to correspond directionally to the position imposed on the line of sight. An automatic linkage 52 to the light source 53 causes the light source to advance from the focal point of the reflector 54 to provide a dispersion of the light beam over the target. A brilliance control rheostat (not shown) is provided for the pilot to control brilliance, thereby minimizing the tendency toward vertigo (previously described) and impairment of night vision.

FIG. 8 illustrates the tactical use of the line of sight hover coupler 10 in a typical air-sea rescue operation. During the search, the wind direction and velocity are determined as accurately as possible in order to provide settings for trim controls 43, 44. For example, if the original homing run in over datum is within 45° of the wind direction (downward approach) the procedures that follow must be different than those to be followed when the final heading is within 45° of the wind's reciprocal (upwind approach) or within 45° of a perpendicular to the windline (beam approach). Well defined final approach procedures may be developed to utilize a supplemental ultra high frequency UHF transmitter, similar to expendable transmitters, to be dropped on a known bearing from datum to provide a semipermanent radio fix at datum.

Assume the helicopter to be in position A, homing on the survivors at datum on UHF direction finder. Without knowledge of the distance to datum, the pilot maintains a speed of 120 knots while monitoring his number one DF needle closely. When he passes over datum, he drops a smokelight and commences timing while maintaining the same heading. When he is 15 seconds beyond datum (1,000 yds.) he drops an expendable UHF radio transmitter into the water and immediately commences a turn downwind (point $b$). His inbound heading, here illustrated as 285° Rel. to the windline, then defines the relative bearing of the line of position (LOP) which intersects the windline at datum or an easily predictable distance downwind, considering the effect of the wind causing the helicopter to drift.

After flying approximately one minute downwind, the pilot commences his turn to approach directly upwind. Meanwhile, the number two needle on the pilot's Radio Magnetic Indicator RMI, monitors the frequency upon which the radio at point $b$ is now transmitting. Maintaining his track to datum with reference to his number one RMI needle, the pilot maintains 60 knots until the No. 2 needle comes within 10 or 15° of the LOP from point $b$ at which time the line of sight hover coupler operator should commence his search with maximum sight and searchlight elevation.

As the operator gains visual contact with the object of the search at datum, he requests a shift to "coupler mode" on the stabilization equipment. The coupler cyclic inputs from the line of sight hover coupler 10 then programs the hover transition and maintains the hover for the hoisting operation as the radar altimeter programs the final descent to the selected hover altitude and maintains it.

When the subject is directly below, the line of sight hover coupler operator holds the reticle centered upon the individual to be hoisted. These controller adjustments constitute stabilization equipment cyclic control inputs to the rotor system which will maintain the proper hover position as the pilot simply monitors the controls and the hover indicator.

While it is understood that the hover coupler of the present invention has been described specifically, in relation to rotary wing aircraft, it is understood that according to the principles of the invention the hover coupler may be employed with other types of hoverable aircraft such as those of the ducted fan or vertical takeoff type, it being appreciated that pitch and roll controls for aircraft attitude may be accomplished in ways other than cyclic pitch control of a rotary wing. Consequently, for such aircraft, lateral and longitudinal axes may be said to correspond for control purposes to pitch and roll axes of rotary wing aircraft. That is, certain aircraft may translate lateral and/or longitudinally to accomplish translation as does pitch and roll thru cyclic pitch control in rotary wing aircraft.

Obviously many modifications and variations of the present invention are possible in the light of the above teachings. It is therefore to be understood that the invention may be practiced otherwise than as specifically described.

I claim:

1. A hover coupler for a hoverable aircraft, said aircraft having a pilot control station from which positions essentially directly below the craft cannot be easily seen by the pilot, said aircraft having flight controls for changing its lateral and longitudinal movement at essentially zero ground speed; and having gyrostabilization means including a stabilization amplifier for receiving signals representing lateral, longitudinal, altitude and steering control signals for providing stabilized signals for controlling via the flight controls the flight maneuvers of the aircraft, a hover coupler system for said aircraft comprising:

downward looking optical sighting means having an operator's viewing station located inside the aircraft, said means including a viewing element mounted outside the aircraft and rotatable about two axes respectively parallel to the lateral and longitudinal axes of the craft;

said viewing element having a predetermined neutral position in pitch and roll presenting a viewing path along a plumbline;

manually controlled means for rotating said viewing element about each of said axes in order to acquire a target on the earth's surface directly over which it is intended to eventually hover the craft at zero speed relative thereto; and said manually controlled means including signal means having a predetermined neutral position corresponding to that of said viewing element, for producing lateral and longitudinal movement control signals simultaneously with, and corresponding directly to, the pitch and roll established on said viewing means and for feeding said signals to the stabilization amplifier and thence to the flight controls of the craft whereby the craft is controlled by the operator in conjunction with a predetermined altitude setting to bring the aircraft to a hover position over the target.

2. The hover coupler according to claim 1 wherein said manually controlled means includes adjustable control trim elements for producing via the stabilization amplifier control signals for varying the neutral position of said signal means to provide other predetermined neutral positions representing either wind speed or target speed, or both, whereby said manually controlled means may be operated to place said viewing element in its plumb position while the aircraft has an airspeed at least greater than zero while hovering.

3. The hover coupler according to claim 2 including a hoisting element mounted on the aircraft, said element having a cable for movement along a line essentially concurrent with the plumbline viewed via said viewing element.

4. The hover coupler according to claim 2 wherein the aircraft is of the rotary wing type and wherein said lateral and longitudinal movement is a direct function of rotation of the aircraft about its pitch and roll axes by means of cyclic pitch control of the rotary wing.

5. The hover coupler according to claim 2 wherein said viewing element comprises a mirror and a radiation member movable therewith to project radiation along the viewing path to the target.